(12) United States Patent
Han et al.

(10) Patent No.: US 11,870,120 B2
(45) Date of Patent: Jan. 9, 2024

(54) MODULAR REDOX FLOW BATTERY

(71) Applicant: H2, INC., Daejeon (KR)

(72) Inventors: Shin Han, Daejeon (KR); Jeehyang Huh, Daejeon (KR); Mun Ja Seok, Daejeon (KR)

(73) Assignee: H2, INC., Daejeon (KR)

( * ) Notice: Subject to any disclaimer, the term of this patent is extended or adjusted under 35 U.S.C. 154(b) by 314 days.

(21) Appl. No.: 17/427,259

(22) PCT Filed: May 3, 2019

(86) PCT No.: PCT/KR2019/005344
§ 371 (c)(1),
(2) Date: Jul. 30, 2021

(87) PCT Pub. No.: WO2020/226190
PCT Pub. Date: Nov. 12, 2020

(65) Prior Publication Data
US 2022/0131171 A1    Apr. 28, 2022

(51) Int. Cl.
| | |
|---|---|
| *H01M 8/18* | (2006.01) |
| *H01M 8/04029* | (2016.01) |
| *H01M 8/04082* | (2016.01) |
| *H01M 8/04276* | (2016.01) |
| *H01M 8/249* | (2016.01) |

(52) U.S. Cl.
CPC ....... *H01M 8/188* (2013.01); *H01M 8/04029* (2013.01); *H01M 8/04082* (2013.01); *H01M 8/04276* (2013.01); *H01M 8/249* (2013.01)

(58) Field of Classification Search
CPC ......... H01M 8/04029; H01M 8/04082; H01M 8/04276; H01M 8/188
See application file for complete search history.

(56) References Cited

U.S. PATENT DOCUMENTS

2012/0164498 A1    6/2012   Vincent et al.

FOREIGN PATENT DOCUMENTS

| KR | 2012-0058043 | * | 6/2012 |
|---|---|---|---|
| KR | 2012-0058043 A | | 6/2012 |
| KR | 2013-0001773 U | | 3/2013 |
| KR | 2017-0005629 | * | 1/2017 |
| KR | 2017-0005629 A | | 1/2017 |
| KR | 2017-0046438 | * | 5/2017 |

(Continued)

OTHER PUBLICATIONS

English translation of KR Publication 2017-0005629, Jan. 2017.*

(Continued)

*Primary Examiner* — Brittany L Raymond
(74) *Attorney, Agent, or Firm* — Cowan, Liebowitz & Latman, P.C.; Anastasia Zhadina (57) ABSTRACT

The present invention relates to a modular redox flow battery comprising a positive electrolyte tank, a negative electrolyte tank, a positive electrolyte, a negative electrolyte, a plurality of stacks, pipes, a positive electrolyte pump and a negative electrolyte pump, a battery management system (=BMS), and sensors, wherein the stacks and the BMS 500 are mounted on a stack frame 800, the positive electrolyte tank and the negative electrolyte tank are mounted on a tank frame 900, and the stack frame 800 and the tank frame 900 are combined.

8 Claims, 8 Drawing Sheets

(56) References Cited

FOREIGN PATENT DOCUMENTS

KR        2017-046438 A      5/2017
KR        102023914 B1      9/2019

OTHER PUBLICATIONS

English translation of KR Publication 2017-0046438, May 2017.*
English translation of KR Publication 2012-0058043, Jun. 2012.*
The International Search Report of International Application No. PCT/KR2019/005344 dated Nov. 12, 2020.

* cited by examiner

MODULAR REDOX FLOW BATTERY

BACKGROUND OF THE INVENTION

Field of the Invention

The present invention relates to a Modular Redox Flow Battery.

Description of the Related Art

A redox flow battery module consists of one or more stacks, BOP (pumps, pipes, sensors, a control device, etc.), a positive electrolyte (=a catholyte), a negative electrolyte (=an anolyte), and a pair of electrolyte tanks. A redox flow battery system comprises one redox flow battery module or a plurality of redox flow battery modules which are connected.

BOP is an abbreviation of Balance of Plant, and refers to components or peripheral mechanical devices excluding stacks and electrolytes in a redox flow battery.

Since a place where the redox flow battery system is manufactured and a place where it is installed are different, it takes a lot of time and money to transport the manufactured redox flow battery system to the installation site and install it.

In addition, in the redox flow battery system, the tanks for supplying the electrolytes are generally installed separately from the stacks instead of being integrated as one.

Since the electrolyte tanks and the rest parts cannot be transported at once, they have to be transported separately and then assembled on site and pipe work is required on the site, which requires a lot of time and money for installation.

In addition, it is not easy to assemble and test them in module by module on the production site in advance.

The present invention relates to a modular redox flow battery system and output power and energy can be increased by manufacturing a redox flow battery as a module and interconnecting the modules with increasing the number of modules.

"SYSTEMS AND METHODS FOR REDOX FLOW BATTERY SCALABLE MODULAR REACTANT STORAGE" has been disclosed in Korean Patent Publication No. 10-2013-0132488 (2013.12.04). However, they do not relate to a module of parts making up a redox flow battery like the present invention and they relate to a first anolyte storage module and a first catholyte storage module.

PRIOR ART LITERATURE (Patent Document 1) Korean Patent Publication No. 10-2013-0132488 (2013.12.04)

The present invention relates to a modular redox flow battery system, and it is to increase output power and energy easily by manufacturing a redox flow battery as a module and interconnecting the modules with increasing the number of modules.

SUMMARY OF THE INVENTION

The present invention relates to a modular redox flow battery comprising a positive electrolyte tank, a negative electrolyte tank, a positive electrolyte, a negative electrolyte, a plurality of stacks, pipes, a positive electrolyte pump and a negative electrolyte pump, a battery management system (=BMS), and sensors, wherein the stacks and the BMS 500 are mounted on a stack frame 800, the positive electrolyte tank and the negative electrolyte tank are mounted on a tank frame 900, and the stack frame 800 and the tank frame 900 are combined.

Additionally, the positive electrolyte tank and the negative electrolyte tank of the present invention are in the form of a rectangular parallelepiped in which a portion is removed and a space 260A for mounting a pump is formed in a place where the portion is removed. A pump support frame 700 including a vibration absorber may be connected and installed to the tank frame 900 in the space 260A, and the pump may be installed on the pump support frame.

In addition, the tanks of the present invention are provided with an inlet flange 230A into which the electrolyte is introduced and an outlet flange 250A through which the electrolyte is discharged. The inlet flange 230A is installed above the outlet flange, and the inlet flange 230A may be connected to a 'L' shaped pipe 231A.

In addition, in the present invention, an electrolyte injection and removal flange 240A is further included at a lower place than the inlet flange 230A of the tank, and a dip pipe 241A may be connected to the electrolyte injection and removal flange.

In addition, in the present invention, the pipes connecting the tank and the stack are preferably located in higher places than the stack and the electrolyte level of the tank.

In addition, in the present invention, the stack frame 800 is equipped with a leakage prevention tray 820 so that when leakage occurs in the stack, the leakage can be collected in the leakage prevention tray.

In addition, in the present invention, a side support of the frame 800 is provided with cable fixing holes 810 for fixing cables and the cable fixing holes are formed by drilling several small holes. A guide 840 and a sliding plate 830 are installed at both sides of the stack leakage prevention tray. An inner surface of a lower part of an end plate or a foot 411A of the stack is guided by the guide 840. A bottom surface slides on the sliding plate so that the stack can be installed above the stack leakage prevention tray 820.

In addition, in the present invention, the sliding plate 830 has a flow path 831 so that even if the electrolyte falls on the sliding plate, it can enter the leakage prevention tray 820 along the flow path.

In addition, in the present invention, the module may include a heat exchanger 300 for exchanging heat of the electrolyte with that of coolant for lowering the electrolyte temperature, and a chiller for cooling the coolant temperature.

The modular structure of the present invention includes a stack, BOP (pumps, a control device, pipes, sensors, etc.), electrolyte tanks, and electrolytes which are essential parts of the redox flow battery, as a single structure. Therefore, it is possible to move and install it as a module unit and thus field work can be reduced.

In addition, the works such as pipe connection are completed in a modular form during the manufacturing process, the module is transported to and is placed in the field site and only electrical connection is performed on the site. Therefore, it is easy to make an installation on the site.

In addition, the modular structure of the present invention can be used alone. For ease of transport and installation, it can be placed in a standard 10 ft or 20 ft container or an extended one in the height direction and be used.

In addition, the present invention enables independent operation on a per-module basis so that even if a problem occurs in a portion of the system, only the module in which the problem occurs can be stopped, thereby increasing the operation rate.

In addition, when changing the size of the system of the present invention, it is possible to easily change the number of modules without the need for additional design change.

In addition, since the same module can be repeatedly produced, it is possible to reduce production costs through mass production in the present invention.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
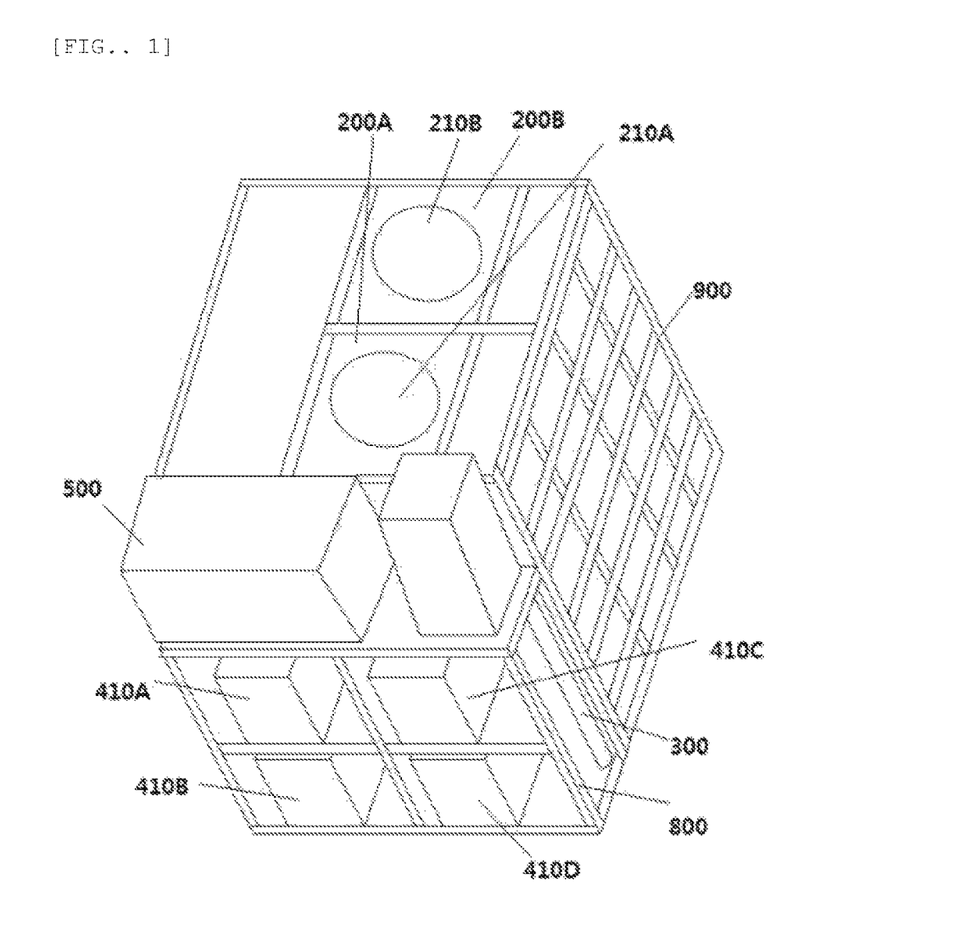
FIG. 1 is a perspective view of a module of the present invention.
Figure 2:
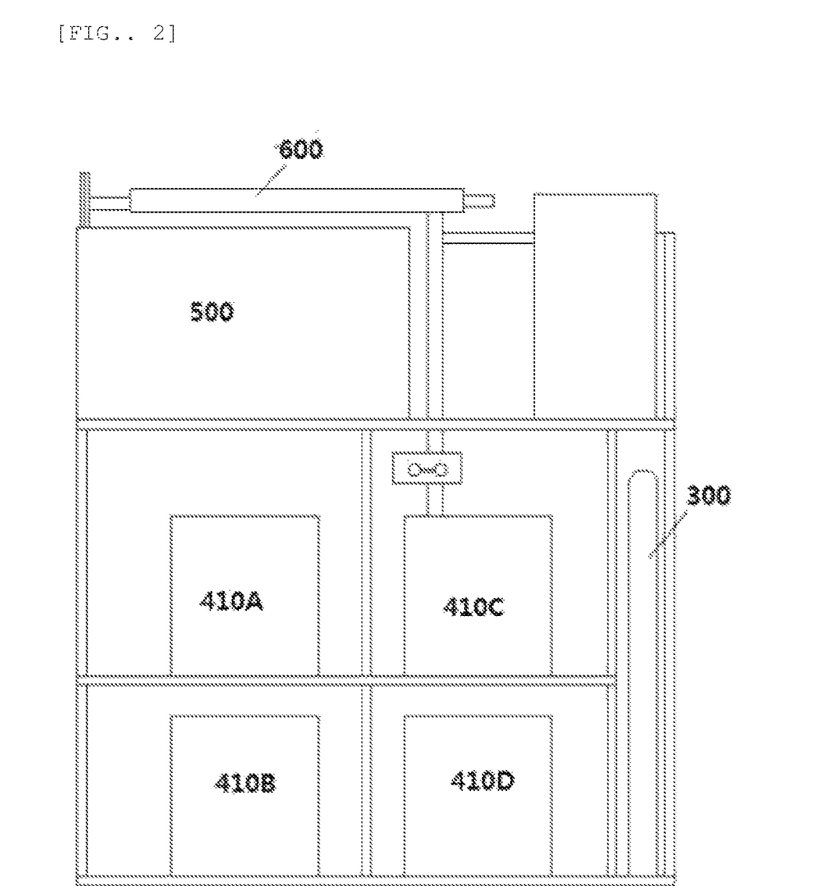
FIG. 2 is a view of a side on which stacks of the module of the present invention are installed.

FIG. 1 is a three-dimensional perspective view of the redox flow battery module of the present invention and the present invention consists of positive and negative electrolyte tanks (200A, 200B), positive and negative electrolytes, a plurality of stacks (410A, 410B, 410C, 410D), pipes (600), positive and negative electrolyte pumps (not shown), BMS (500, a battery management system), and sensors.

The module of the present invention has a size that can be installed in a standard container of 20 ft or 10 ft.

The module of the present invention includes a tank frame 900 on which a tank part is mounted and a stack frame 800 on which a stack is mounted. The two frames are combined into one by using bolting or welding and are movable at once.

In the present invention, two tanks (200A, 200B) are positioned side by side, and the stacks and the BMS 500 are positioned in the front so that the stacks and the BMS can be accessed from the front, thereby facilitating maintenance.

Figure 3:
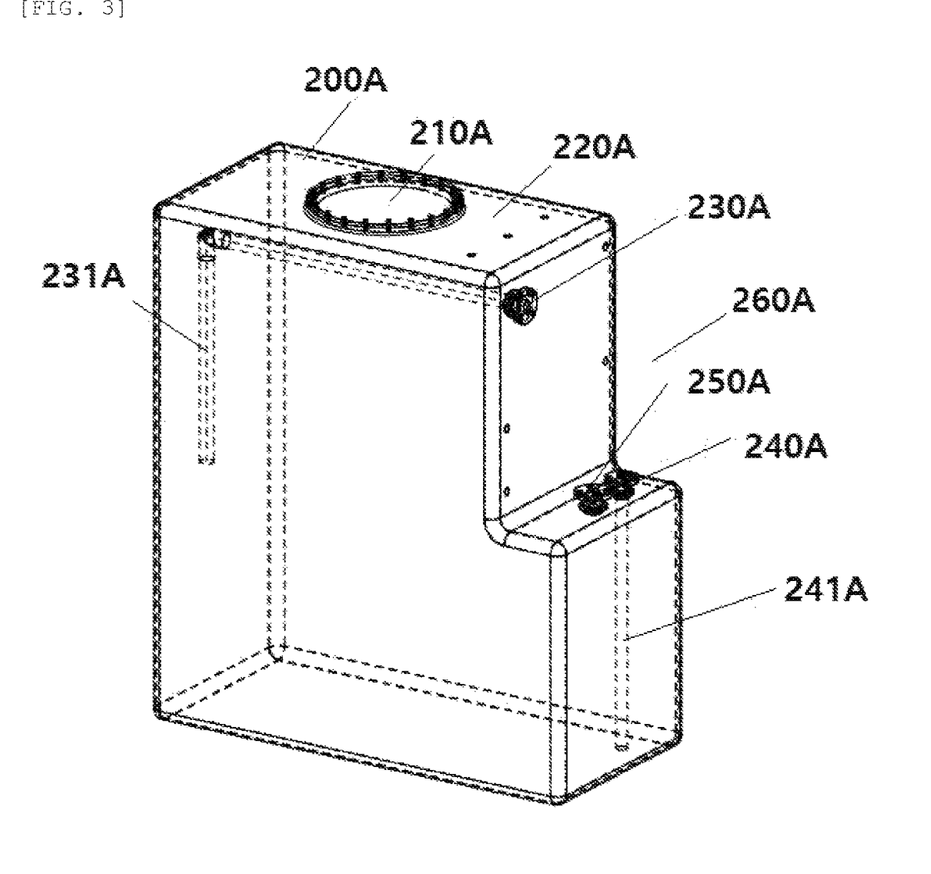
FIG. 3 is a transparent perspective view of the electrolyte tank of the module of the present invention.

As shown in FIG. 3, the tank 200A is configured as a rectangular parallelepiped shape having a removed portion for space utilization, and a space 260A for mounting a pump is formed in the removed portion.

Figure 4:
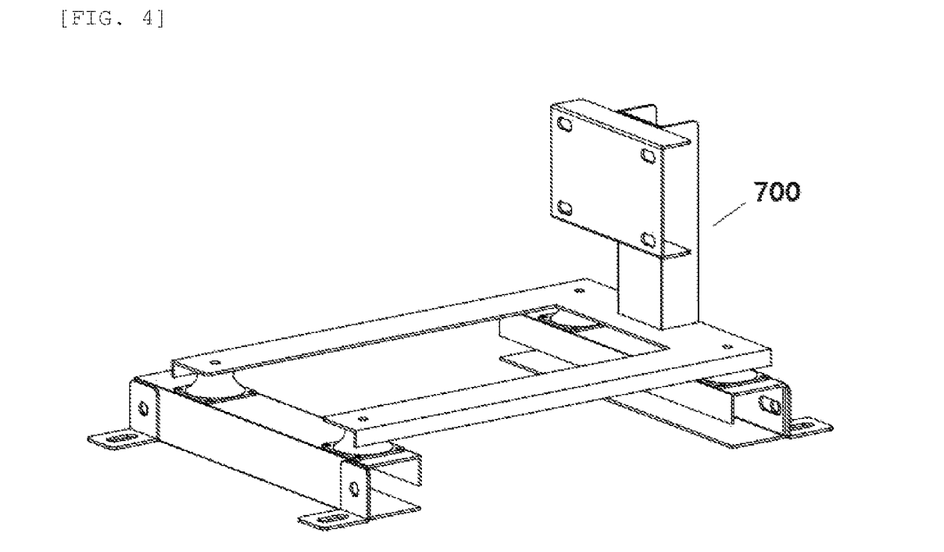
FIG. 4 is a perspective view of a pump support frame on which a pump is installed.
Figure 5:
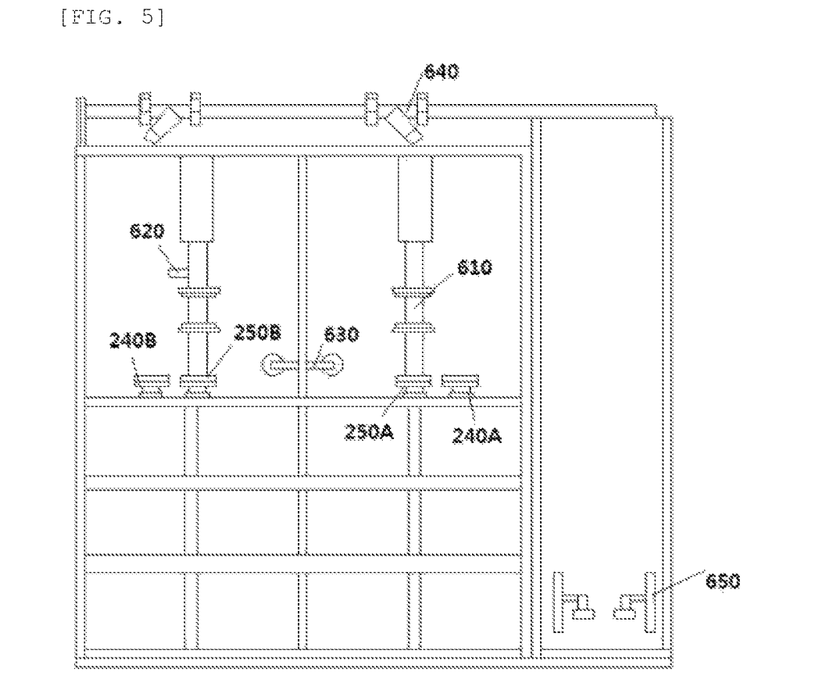
FIG. 5 is a side view of the module perspective view of FIG. 1.
Figure 6:
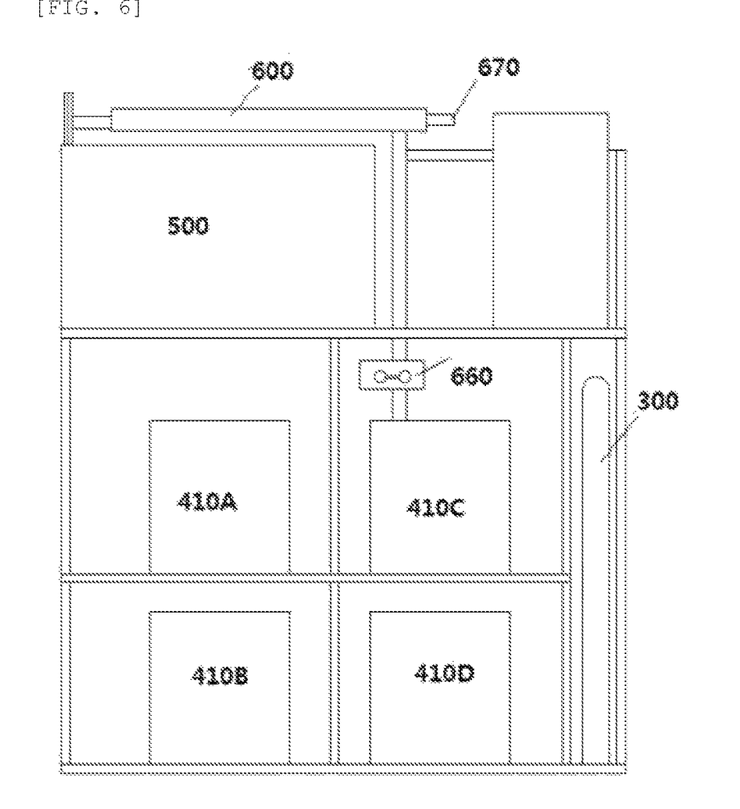
FIG. 6 is a front view of FIG. 1.

A pump support frame 700 of FIG. 4 is connected and installed to the tank frame 900 in the space 260A, and the tank 200A is placed thereon.

In addition, the tank is made of a material such as polyethylene (PE) having acid resistance, and the wall thickness is made to be at least 5 mm to prevent air from penetrating the tank wall and oxidizing the electrolyte.

In order for the tank to withstand the static pressure of the electrolyte, the outside of the plastic tank is reinforced with a metal structure.

The metal material is treated with anti-corrosion coating to prevent corrosion even if the electrolyte splashes.

Metal plates are placed on inner surfaces of the metal structure and line-welding is performed so that there is no seam. The external metal tank prevents the electrolyte leakage even if any leakage occurs in the plastic tank and thus a double leakage prevention container structure (=double spill containment) is designed.

It is possible to maintain the same amount of electrolyte in the two electrolyte tanks and balance the electrolyte by installing an electrolyte level maintenance pipe 630 connecting the positive electrolyte tank and the negative electrolyte tank.

An inlet flange 230A is installed at the uppermost position of the front of the tank and the electrolyte discharged by the outlet pipe of the stack is introduced into the tank through the inlet flange 230A. An outlet flange 250A is installed on a lower position of the front of the tank and is connected to a suction pipe (an inlet pipe) of the pump. The electrolyte of the tank is discharged through the outlet flange 250A.

If the distance between an inlet pipe and an outlet pipe is close, the electrolyte does not mix well inside the tank and the electrolyte that has finished chemical reaction from the stack returns right back into the stack. Therefore, in order to keep the distance between the two pipes as far away as possible, the inlet flange 230A which is connected to the outlet pipe of the stack is additionally connected to a pipe 231A to allow the introduced electrolyte to go to the back in the tank.

In addition, if an end of the pipe 231A is higher than the electrolyte level in the tank, bubbles may be formed, the electrolyte may be oxidized, and air may flow into the pipe when the operation of the pump stops. In order to prevent this, the pipe connected to the inlet flange 230A extends downward to a height where it can be immersed in the electrolyte.

In order to be able to add the electrolyte into and extract it out of the tank, an electrolyte injection and removal flange 240A is mounted on the lower place of the tank in addition to the outlet flange 250A and a dip pipe 241A is connected to the flange 240A and a valve is added.

The electrolyte may be injected through the electrolyte injection and removal flange 240A, and the electrolyte in the tank may be removed by connecting the flange 240A to the suction part of the pump.

In order to drain the electrolyte in the tank as much as possible, it is preferable that the pipe should extend downward to be close to the bottom.

A float switch is installed at the top of the tank to be activated when the electrolyte level rises above the dangerous level. This switch can be linked to the BMS to generate a warning signal or to stop the pump.

In the above example, a vertical shaft pump is used, but a horizontally installed magnetic pump can be used if necessary.

Valves are installed at the inlet and outlet of the tank so that it is possible to repair the pipes and replace a pump. (In other words, the pipes are repaired and the pump is replaced after closing the valves)

A limit switch is installed on the valves of the inlet/outlet of the tank to identify the open state of the valve and is linked with the BMS to disable the operation of the pump when the valve is closed.

In the present invention, a flexible pipe element such as a rubber compensator 610 is inserted in order to remove the dimensional tolerance of the pipe.

A drain valve 650 is installed at a place below the pump to receive the electrolyte remaining in the pipe when replacing the pump.

A vibration absorber is added to the pump support frame 700 to prevent the vibration of the pump from being transmitted to the tank and to absorb the height tolerance.

The pipes 600 are composed of a total of 4 sets including two sets of inlet pipes heading for the positive/negative electrodes of the stack and two sets of the outlet pipes through which electrolytes are discharged from the positive/negative electrodes of the stack.

The pipes are preferably formed of a material having acid resistance such as PVC, PP and PE.

The pipe connecting the tank and the stack is installed at a higher position than the stack and is positioned higher than the electrolyte level in the tank, so that even if the stack leaks or the pipe is damaged, it prevents electrolyte in the tank from completely leaking out.

By adding a pressure sensor linked with BMS to the pipe, the pump stops when the pipe pressure is higher or lower than the standard.

A strainer 640 is mounted in front of an inlet port of the stack in order to prevent impurities of the electrolyte from entering the stack and damaging the stack.

An air vent valve 670 is installed at the highest point of the pipe to remove the air filled in the pipe during initial operation.

The pump is not able to push the electrolyte without the air vent valve and at least one air vent valve is respectively installed in cathode and anode.

For repair of the stacks or pipes, at least one drain valve (650) is installed in a lower position of each set of pipes to remove the electrolyte.

Figure 7:
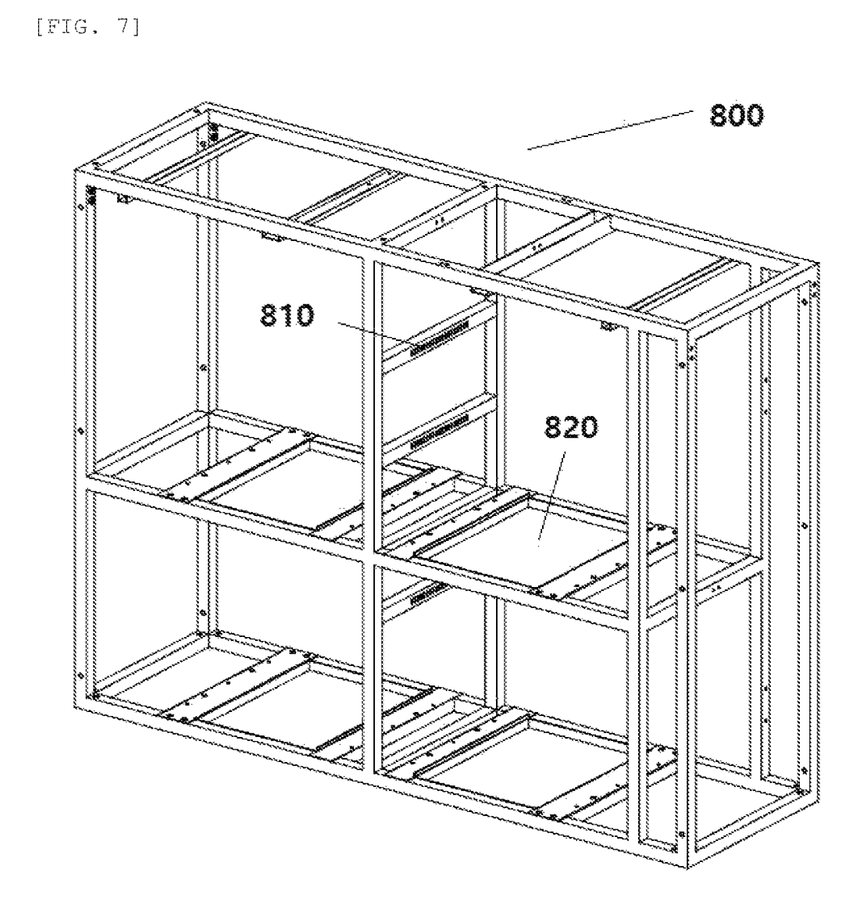
FIG. 7 is a perspective view of a stack frame 800 on which stacks of the present invention are stacked.

The stack frame 800 is equipped with a plurality of stacks, pipes for the stacks, a heat exchanger, a cell for measuring SOC and BMS.

Multiple stacks can be connected in series or parallel to satisfy electrical requirements.

A seamless leakage prevention tray in the form of a box without a lid is installed below the bottom of the stack, so that even if a small amount of liquid leaks from the stack, it does not fall to the floor and is collected in the leakage prevention tray 820.

Cable fixing holes 810 for fixing the cables are formed in a side support of the frame 800 by drilling several small holes.

Figure 8:
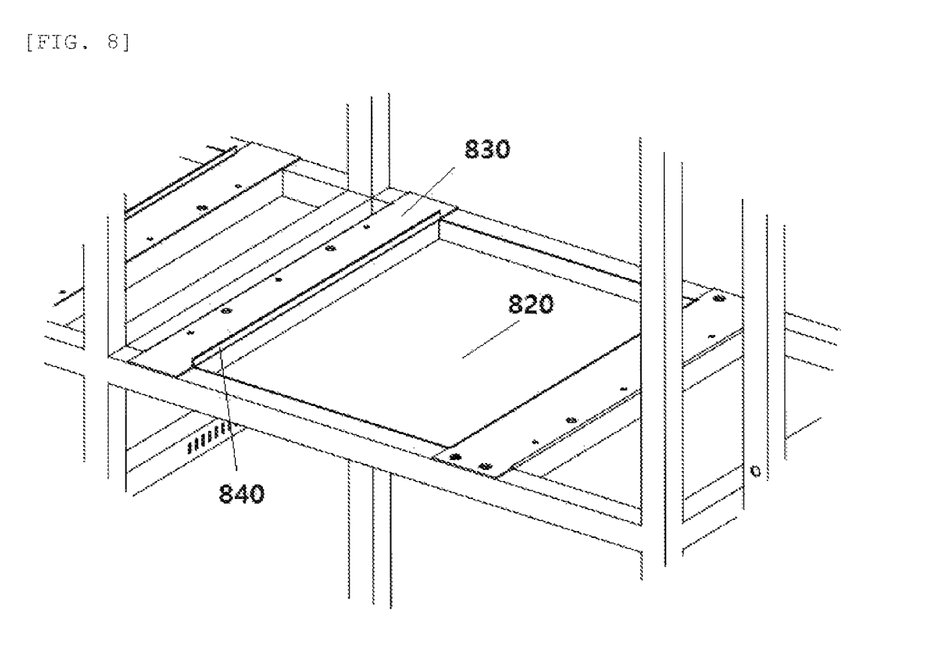
FIG. 8 is an enlarged perspective view of FIG. 7.

There are a guide 840 and a sliding plate 830 at a place where the stack is mounted, so that the stack can be mounted by sliding along the guide.

Figure 9:
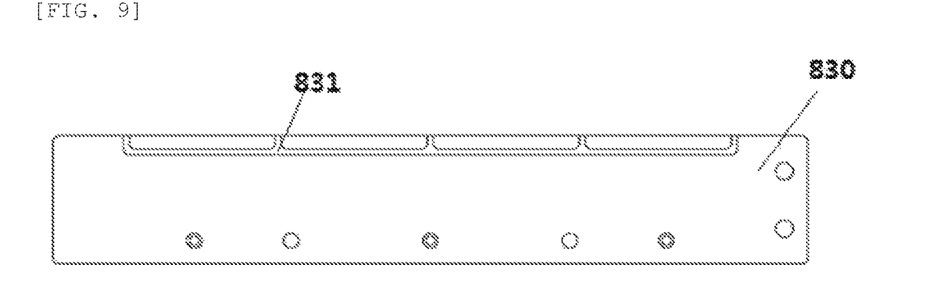
FIG. 9 is an enlarged view of the sliding plate 830 of the present invention.

The sliding plate 830 is made of a smooth plastic plate having a small coefficient of friction such as PE (polyethylene) or acetal.

Figure 11:
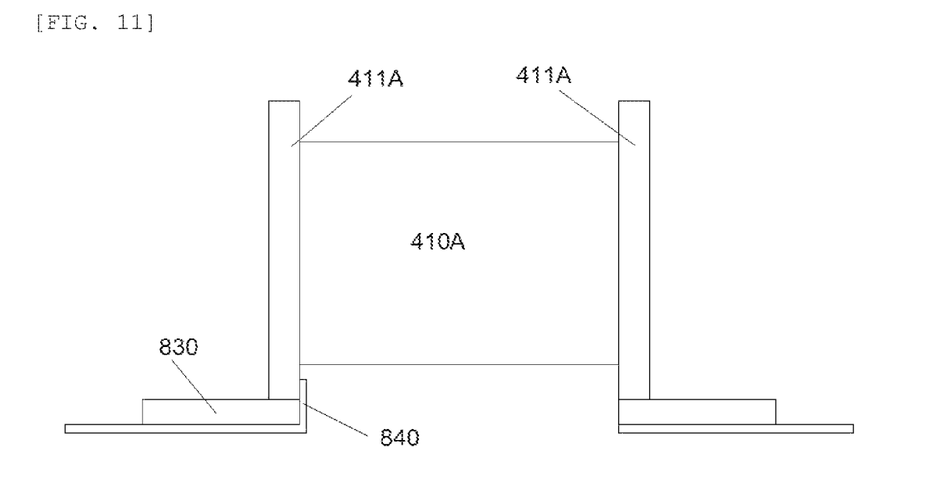
FIG. 11 is a perspective view in which the stack is installed above the leakage prevention plate.

Reviewing FIG. 11, it is understood that the inner surface of the lower portion of the end plate or foot 411A of the stack is guided by the guide 840, the bottom surface slides on the sliding plate 830, and the stack is installed above the leakage prevention tray 820.

The foot may be in the form of a rail attached to the bottom of the stack when the stack has a rectangular parallelepiped shape, and the stack can slide on the sliding plate 830 by the foot.

The sliding plate 830 has a flow path 831 so that even if the electrolyte falls on the sliding plate, it can enter the leakage prevention tray 820 along the flow path.

The temperature requirements vary depending on the redox flow battery couple.

When the temperature of the electrolyte exceeds 40° C. and a certain period of time elapses in a charged state in a vanadium redox flow battery, $V_2O_5$ in the electrolyte is precipitated.

Therefore, in order to prevent this, a heat exchanger 300 is added to the module of the present invention to lower the temperature of the electrolyte through heat exchange with cold coolant.

The material of the heat exchanger is selected as material having acid resistance.

It is possible to turn on or off a chiller for cooling the coolant by installing an electrolyte temperature sensor and linking the sensor with the BMS In order to measure the SOC of the battery, the pipes are branched and a SOC measurement cell 660 is mounted at the pipes. In the SOC measurement cell 660, no current flows but only electrolyte flows, so that OCV (open current voltage) is measured and the SOC can be measured based on a correlation between OCV and SOC.

Figure 10:
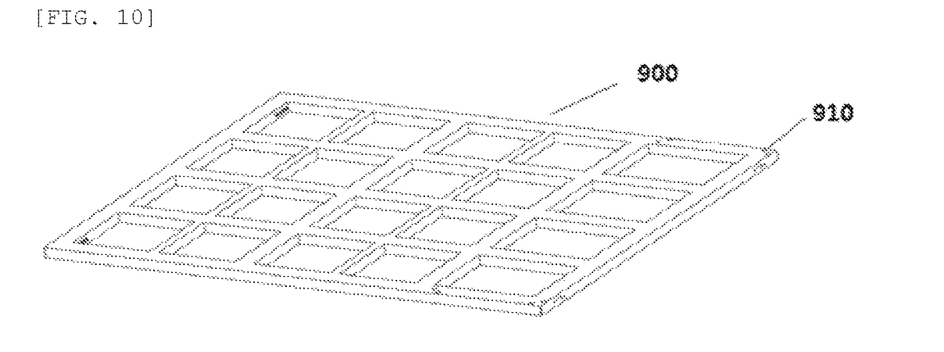
FIG. 10 is a perspective view of the base frame 900 of the module of the present invention.

The entire module is fixed to one base frame 900 and the base frame is designed to have sufficient rigidity to support the weight of the module.

It is possible to lift and move the module by drilling bolt holes 910 on the four corners of the base frame and combining the ring-shaped fixing jig to the holes. A nut is pre-welded to the back of each bolt hole to facilitate an engagement of a bolt with the nut after the bolt had passed through the bolt hole.

In the technical field to which the present invention pertains, the present invention described above is not limited by the above-described embodiments and the accompanying drawings, and various substitutions, additions and changes are possible within the scope without departing from the technical spirit of the present invention. It will be clear to those of ordinary skill in the art.

EXPLANATION ABOUT REFERENCE NUMBERS 200A, 200B: a positive electrolyte/a negative electrolyte tanks
210A, 210B: a tank lid
220A: a tank body 230A: an inlet flange
240A: an electrolyte injection/removal flange
250A: an outlet flange
300: a heat exchanger
410A, 410B, 410C, 410D: stacks
500: Battery Management System
600: pipes
610: a rubber compensator
620: a pump drain valve
630: an electrolyte level maintenance pipe
640: a strainer
650: a drain valve
700: a pump support frame

What is claimed is:

1. A modular redox flow battery comprising a positive electrolyte tank; a negative electrolyte tank; a positive electrolyte; a negative electrolyte; a plurality of stacks; pipes; a positive electrolyte pump; a negative electrolyte pump; a battery management system; and sensors, wherein the stacks and the battery management system (500) are mounted on a stack frame (800), the positive electrolyte tank and the negative electrolyte tank are mounted on a tank frame (900), and the stack frame (800) and the tank frame (900) are combined, and wherein the positive electrolyte tank and the negative electrolyte tank are in the form of a rectangular parallelepiped in which a portion is removed, a space (260A) for mounting the positive electrolyte pump or the negative electrolyte pump is formed in a place where the portion is removed, a pump support frame (700) including a vibration absorber is connected and installed to the tank frame (900) in the space (260A), and the positive electrolyte pump or the negative electrolyte pump is installed on the pump support frame.

2. The modular redox flow battery of claim 1, wherein the tanks are provided with an inlet flange (230A) into which the electrolyte is introduced and an outlet flange (250A) through which the electrolyte is discharged, the inlet flange (230A) is installed above the outlet flange, and the inlet flange (230A) is connected to 'L' shaped pipe (231A).

3. The modular redox flow battery of claim 2, wherein an electrolyte injection and removal flange (240A) is further included at a lower place than the inlet flange (230A) of the tank, and a dip pipe (241A) is connected to the electrolyte injection and removal flange.

4. The modular redox flow battery of claim 1, wherein pipes connecting the tanks and the stacks are located in higher places than the stacks and the electrolyte level of the tanks.

5. The modular redox flow battery of claim 1, wherein the stack frame (800) is equipped with a leakage prevention tray (820) so that when leakage occurs in the stacks, the leakage can be collected in the leakage prevention tray.

6. The modular redox flow battery of claim 5, wherein cable fixing holes (810) for fixing cables are installed on a side support of the frame (800) by drilling several small holes, a guide (840) and a sliding plate (830) are installed at both sides of the leakage prevention tray, an inner surface of a lower part of an end plate or a foot (411A) of each of the plurality of stacks is guided by the guide (840), and a bottom surface of the end plate or foot (411A) slides on the sliding plate so that each of the plurality of stacks is installed above the leakage prevention tray (820).

7. The modular redox flow battery of claim 6, wherein the sliding plate (830) has a flow path (831) so that when the electrolyte falls on the sliding plate, the electrolyte can enter the leakage prevention tray (820) along the flow path.

8. The modular redox flow battery of claim 1, wherein the modular redox flow battery includes a heat exchanger (300) for exchanging heat of the electrolyte with that of coolant for lowering the electrolyte temperature, and a chiller for lowering the temperature of the coolant.

* * * * *